US009777151B2

(12) United States Patent
Sohn et al.

(10) Patent No.: US 9,777,151 B2
(45) Date of Patent: Oct. 3, 2017

(54) POLYMER RESIN COMPOSITION HAVING EXCELLENT IMPACT RESISTANCE OR HEAT RESISTANCE

(71) Applicant: SK CHEMICALS CO., LTD., Gyeonggi-do (KR)

(72) Inventors: Dong-Cheol Sohn, Gyeonggi-do (KR); Byung-Woo Ahn, Incheon (KR); Jong-Wook Shin, Gyeonggi-do (KR); Jong-Ryang Kim, Gyeonggi-do (KR)

(73) Assignee: SK CHEMICAL CO., LTD, Gyeonngi-Do (KR)

( * ) Notice: Subject to any disclaimer, the term of this patent is extended or adjusted under 35 U.S.C. 154(b) by 0 days.

(21) Appl. No.: 14/765,942

(22) PCT Filed: Feb. 6, 2014

(86) PCT No.: PCT/KR2014/001029
§ 371 (c)(1),
(2) Date: Aug. 5, 2015

(87) PCT Pub. No.: WO2014/123373
PCT Pub. Date: Aug. 14, 2014

(65) Prior Publication Data
US 2015/0368460 A1 Dec. 24, 2015

(30) Foreign Application Priority Data
Feb. 6, 2013 (KR) ........................ 10-2013-0013450

(51) Int. Cl.
C08L 67/03 (2006.01)
C08L 55/02 (2006.01)
C08L 67/02 (2006.01)
C08L 69/00 (2006.01)

(52) U.S. Cl.
CPC .............. C08L 67/03 (2013.01); C08L 55/02 (2013.01); C08L 67/02 (2013.01); C08L 69/00 (2013.01); C08L 2201/02 (2013.01); C08L 2205/03 (2013.01)

(58) Field of Classification Search
CPC .......... C08L 67/02; C08L 51/04; C08L 55/02; C08L 51/085; C08L 69/00
See application file for complete search history.

(56) References Cited

U.S. PATENT DOCUMENTS

| 5,082,897 | A | 1/1992 | Udipi |
| 6,140,422 | A | 10/2000 | Khanarian et al. |
| 6,485,819 | B2 * | 11/2002 | Hayes ..................... B32B 27/06 428/221 |
| 7,067,567 | B2 * | 6/2006 | Seidel .................. C08K 5/0066 523/201 |
| 2001/0034415 | A1 * | 10/2001 | Queisser ................. C08L 25/04 525/212 |
| 2002/0115817 | A1 | 8/2002 | Hayes |
| 2004/0132877 | A1 | 7/2004 | Seidel et al. |
| 2011/0071235 | A1 | 3/2011 | Kannan et al. |
| 2012/0177854 | A1 | 7/2012 | Lee et al. |
| 2016/0122537 | A1 * | 5/2016 | Lee ......................... C08L 69/00 523/201 |
| 2016/0137834 | A1 * | 5/2016 | Sohn ........................ C08L 69/00 524/195 |
| 2016/0137835 | A1 * | 5/2016 | Sohn ........................ C08L 67/025 523/436 |
| 2016/0147834 | A1 * | 5/2016 | Lee .................... G06F 17/30463 707/718 |
| 2016/0347950 | A1 * | 12/2016 | Sohn ........................ C08L 69/00 |
| 2016/0369092 | A1 * | 12/2016 | Sohn ........................ C08L 55/02 |
| 2016/0369094 | A1 * | 12/2016 | Sohn ........................ C08L 51/04 |

FOREIGN PATENT DOCUMENTS

| CN | 1298426 | | 6/2001 | |
| CN | 102498150 | | 6/2012 | |
| CN | 102604360 | A * | 7/2012 | ......... B29C 47/0011 |
| CN | 102686656 | | 9/2012 | |
| EP | 1207172 | A2 * | 5/2002 | ............ C08F 265/04 |
| EP | 2519557 | B1 | 7/2015 | |
| EP | 3009475 | | 4/2016 | |
| EP | 3009476 | | 4/2016 | |
| JP | 03056556 | A * | 3/1991 | |
| JP | 2000-313747 | A | 11/2000 | |
| JP | 2006-137888 | A | 6/2006 | |
| JP | 2007051194 | A * | 3/2007 | |

(Continued)

OTHER PUBLICATIONS https://en.wikipedia.org/wiki/Polycarbonate, May 2004.*
KR1020080132557, Jul. 2010, Machine translation.*
KR10-2009-0086244, Mar. 2011, Machine translation.*
JP 2007051194 A, Mar. 2007, DERWENT Ab.*
JP 03056556 A, Mar. 1991, Machine translation.*
CN 102604360 A, Jul. 2012, DERWENT Ab.*
Extended Search Report for European Patent Application No. 14749357.1, dated Aug. 5, 2016, 9 pages.
International Search Report prepared by the Korean International Searching Authority on May 23, 2014, for International Application No. PCT/KR2014/001029.

Primary Examiner — Satya Sastri
(74) Attorney, Agent, or Firm — Sheridan Ross P.C.

(57) ABSTRACT

A polymer resin composition capable of providing a synthetic resin showing physical properties of improved heat resistance or impact resistance is provided, in which the polymer resin composition includes a polyester tetrapolymer containing a residue of a dicarboxylic acid component containing terephthalic acid and a residue of a diol component containing dianhydrohexitol, and one or more terpolymers selected from the group consisting of an unsaturated nitrile-diene-based rubber-aromatic vinyl graft terpolymer, an alkyl methacrylate-diene-based rubber-aromatic vinyl graft terpolymer, and an alkyl methacrylate-silicone/alkyl acrylate graft terpolymer.

18 Claims, No Drawings

(56) References Cited

FOREIGN PATENT DOCUMENTS

| KR | 10-1994-0004006 A | 3/1994 |
|----|-------------------|--------|
| KR | 10-2009-0008825 A | 1/2009 |
| KR | 10-2009-0021716 A | 3/2009 |
| KR | 10-2009-0080132 A | 7/2009 |
| KR | 10-2011-0028696 A | 3/2011 |
| KR | 10-2011-0079466 a | 7/2011 |
| KR | 10-1098126 B1 | 12/2011 |
| WO | WO 99/54399 | 10/1999 |

* cited by examiner

POLYMER RESIN COMPOSITION HAVING EXCELLENT IMPACT RESISTANCE OR HEAT RESISTANCE

CROSS REFERENCE TO RELATED APPLICATIONS

This application is a national stage application under 35 U.S.C. 371 and claims the benefit of PCT Application No. PCT/KR2014/001029 having an international filing date of Feb. 6, 2014, which designated the United States, which PCT application claimed the benefit of Korean Patent Application No. 10-2013-0013450 filed Feb. 6, 2013, the disclosures of each of which are incorporated herein by reference.

TECHNICAL FIELD

The present invention relates to a polymer resin composition, and more particularly, to a polymer resin composition capable of providing a synthetic resin showing physical properties of improved heat resistance or impact resistance.

BACKGROUND OF ART

Polyester resins are widely used in reinforced plastics, paints, films, and resins for molding, and are also used as fabric materials to produce clothing due to properties of superior heat resistance, mechanical strength, and elastic strength.

Recently, use of polyester resins in the fields of interior building materials or molded sign panels is increasing because of the characteristic physical properties. However, polyester resins have lower heat resistance than other polymer materials, for example, acrylic materials or polycarbonate materials, and thus there is a problem that polyester resins are not suitable for exterior building materials under severe change of seasonal temperatures.

Meanwhile, polycarbonate resins are used in a variety of fields of building materials and housings for electronic products, packaging materials, cases, boxes, and interior/exterior building materials due to excellent properties of impact resistance or heat resistance. Demands for such polycarbonate resins are increasing due to excellent mechanical properties, but there are problems that discoloration or cracking of polycarbonate products may occur by frequently used cleaners, cosmetics for women, or hand sanitizers for infants, or deterioration of polycarbonate products may occur by various household chemicals.

There have been many attempts to solve the problems of the polyester resins or polycarbonate resins, and studies on blending of the polyester resins with the polycarbonate resins have been conducted.

Further, a technique of improving impact resistance and heat resistance by blending an acrylonitrile-butadiene-styrene (ABS)-based graft terpolymer with a polycarbonate resin has been developed, but there is a limitation in that the product is not an environment-friendly biomass product.

Meanwhile, since the polyester resin and the polycarbonate resin are different from each other in terms of melting point and molecular structure, it is difficult to improve heat resistance only by simple blending thereof. Further, many methods have been used in order to improve chemical resistance while maintaining mechanical properties of a polycarbonate, in particular, heat resistance, but there were problems that the improvement of chemical resistance is not sufficient to be practically industrially applicable, and appearance of resin products is deteriorated. Furthermore, a method of further blending one or more materials has been attempted in order to improve heat resistance and chemical resistance at the same time, but it was difficult to obtain satisfactory chemical resistance.

Accordingly, it is necessary to develop an environment-friendly resin composition showing excellent heat resistance or impact resistance by blending of these resins.

DETAILED DESCRIPTION OF THE INVENTION

[Technical Problem]

The present invention provides a polymer resin composition capable of providing a synthetic resin showing physical properties of improved heat resistance or impact resistance.

[Technical Solution]

The present invention provides a polymer resin composition including: a polyester tetrapolymer containing a residue of a dicarboxylic acid component containing terephthalic acid and a residue of a diol component containing dianhydrohexitol; and one or more terpolymers selected from the group consisting of an unsaturated nitrile-diene-based rubber-aromatic vinyl graft terpolymer, an alkylmethacrylate-diene-based rubber-aromatic vinyl graft terpolymer, and an alkylmethacrylate-silicone/alkylacrylate graft terpolymer.

The polymer resin composition may include 5 to 90% by weight of the polyester tetrapolymer, and 1 to 80% by weight of one or more terpolymers selected from the group consisting of the unsaturated nitrile-diene-based rubber-aromatic vinyl graft terpolymer, the alkylmethacrylate-diene-based rubber-aromatic vinyl graft terpolymer, and the alkylmethacrylate-silicone/alkylacrylate graft terpolymer.

The polymer resin composition may further include 5 to 90% by weight of polycarbonate.

The polymer resin composition may further include one or more selected from the group consisting of an aromatic vinyl-aromatic maleimide-maleic anhydride terpolymer, an aromatic vinyl-unsaturated nitrile-aromatic maleimide terpolymer, an aromatic vinyl-α-methyl aromatic vinyl terpolymer, and an aromatic vinyl-unsaturated nitrile-α-methyl aromatic vinyl terpolymer.

The polyester tetrapolymer may have a weight average molecular weight of 10,000 to 100,000 and a glass transition temperature of 0 to 200° C.

In the polyester tetrapolymer, the dicarboxylic acid component may further include one or more selected from the group consisting of aromatic dicarboxylic acid having 8 to 20 carbon atoms, and aliphatic dicarboxylic acid having 4 to 20 carbon atoms.

In the polyester tetrapolymer, the dianhydrohexitol may be isosorbide.

In the polyester tetrapolymer, the content of dianhydrohexitol may be 5 to 60 mol %, based on the total content of the diol component.

In the polyester tetrapolymer, the diol component may further include one or more selected from the group consisting of compounds represented by the following Chemical Formulae 1, 2, and 3.

[Chemical Formula 1]

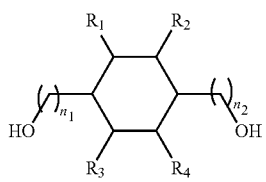

Herein, $R_1$, $R_2$, $R_3$, and $R_4$ are each independently hydrogen or a substituted or unsubstituted alkyl group having 1 to 5 carbon atoms, and $n_1$ and $n_2$ are each independently an integer of 0 to 3.

[Chemical Formula 2]

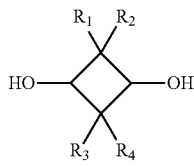

Herein, $R_1$, $R_2$, $R_3$, and $R_4$ are each independently hydrogen or a substituted or unsubstituted alkyl group having 1 to 5 carbon atoms.

[Chemical Formula 3]

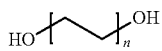

Herein, n is an integer of 1 to 7.

In the polyester tetrapolymer, the diol component may further include 1,4-cyclohexanediol and ethylene glycol.

The unsaturated nitrile-diene-based rubber-aromatic vinyl graft terpolymer may be a core-shell rubber, in which its average particle size may be 0.01 to 5 μm, its graft ratio may be 5 to 90%, a glass transition temperature of the core may be −20° C. or lower, and a glass transition temperature of the shell may be 20° C. or higher.

In the unsaturated nitrile-diene-based rubber-aromatic vinyl graft terpolymer, the unsaturated nitrile may be one or more selected from the group consisting of acrylonitrile, methacrylonitrile, ethacrylonitrile, phenylacrylonitrile, and α-chloroacrylonitrile.

In the graft terpolymer, the diene-based rubber may be a butadiene-type rubber or an isoprene-type rubber.

In the graft terpolymer, the aromatic vinyl may be one or more selected from the group consisting of styrene, α-methyl styrene vinyltoluene, t-butyl styrene, halogen-substituted styrene, 1,3-dimethyl styrene, 2,4-dimethyl styrene, and ethyl styrene.

The unsaturated nitrile-diene-based rubber-aromatic vinyl graft terpolymer may be an acrylonitrile-butadiene-styrene graft terpolymer.

The alkyl methacrylate-diene-based rubber-aromatic vinyl graft terpolymer may be a methyl methacrylate-butadiene-styrene graft terpolymer.

The alkyl methacrylate-silicone/alkyl acrylate graft terpolymer may be a methyl methacrylate-silicone/butylacrylate graft terpolymer.

The polycarbonate may have a glass transition temperature of 50 to 200° C. and a weight average molecular weight of 10,000 to 200,000.

The polymer resin composition may further include one or more selected from the group consisting of an unsaturated nitrile-aromatic vinyl terpolymer, an unsaturated nitrile-aromatic vinyl-glycidyl methacrylate-based compatibilizer, an unsaturated nitrile-aromatic vinyl-maleic anhydride-based compatibilizer, a saturated ethylene-alkylacrylate-glycidyl methacrylate-based compatibilizer, and a carbodiimide-based anti-hydrolysis agent.

The polymer resin composition may include 10% by weight or less of one or more additives selected from the group consisting of an antioxidant, a lubricant, a light stabilizer, a light absorber, a transesterification inhibitor, and an anti-hydrolysis agent, based on the total weight of the composition.

[Advantageous Effects]

According to the present invention, an environment-friendly resin composition capable of providing a synthetic resin showing physical properties of improved heat resistance or impact resistance, and a synthetic resin or a resin molded article obtained by using the same, are provided.

[Detailed Description Of The Embodiments]

While the present invention is susceptible to various modifications and alternative forms, specific exemplary embodiments thereof are herein described in detail. It should be understood, however, that the description thereof is not intended to limit the present invention to the particular forms disclosed, but, on the contrary, the present intention is to cover all modifications, equivalents, and/or alternatives that fall within the spirit and scope of the present invention. In the present specification, if it is determined that a detailed description of related art unnecessarily makes the gist of the present invention unclear, the detailed description thereof will be omitted.

The present invention provides a polymer resin composition including: a polyester tetrapolymer containing a residue of a dicarboxylic acid component containing terephthalic acid and a residue of a diol component containing dianhydrohexitol; and one or more terpolymers selected from the group consisting of an unsaturated nitrile-diene-based rubber-aromatic vinyl graft terpolymer, an alkylmethacrylate-diene-based rubber-aromatic vinyl graft terpolymer, and an alkylmethacrylate-silicone/alkylacrylate graft terpolymer.

Hereinafter, the polymer resin composition according to specific embodiments of the present invention will be described in more detail.

According to an embodiment of the present invention, provided is a polymer resin composition including: a polyester tetrapolymer containing a residue of a dicarboxylic acid component containing terephthalic acid and a residue of a diol component containing dianhydrohexitol; and one or more terpolymers selected from the group consisting of an unsaturated nitrile-diene-based rubber-aromatic vinyl graft terpolymer, an alkylmethacrylate-diene-based rubber-aromatic vinyl graft terpolymer, and an alkylmethacrylate-silicone/alkylacrylate graft terpolymer.

Conventionally, a technique of improving impact resistance and heat resistance by blending an acrylonitrile-butadiene-styrene (ABS) graft terpolymer with a polycarbonate resin has been developed, but there is a limitation in that the product is not an environment-friendly biomass product.

Accordingly, the present inventors studied an environment-friendly resin composition having excellent heat resistance or impact resistance, and they found that a polymer resin composition including a particular polyester tetrapolymer, and one or more terpolymers selected from the group consisting of an unsaturated nitrile-diene-based rubber-aromatic vinyl graft terpolymer, an alkylmethacrylate-diene-based rubber-aromatic vinyl graft terpolymer, and an alkylmethacrylate-silicone/alkylacrylate graft terpolymer, exhibits physical properties of excellent heat resistance or impact resistance, thereby completing the present invention.

In the preparation process of the polymer resin composition, a method and an apparatus generally used in the preparation of a blend or mixture of polymer resins may be used without limitation. For example, the polyester tetrapolymer, and one or more terpolymers selected from the group consisting of an unsaturated nitrile-diene-based rubber-aromatic vinyl graft terpolymer, an alkylmethacrylate-diene-based rubber-aromatic vinyl graft terpolymer, and an alkylmethacrylate-silicone/alkylacrylate graft terpolymer, are put into a general blender, mixer, or tumbler, and blended with each other by a twin-screw kneading extruder so as to provide the polymer resin composition. In the preparation process of the polymer resin composition, respective resins that are sufficiently dried are preferably used.

The polymer resin composition may include 5 to 90% by weight of the polyester tetrapolymer, and 1 to 80% by weight of one or more terpolymers selected from the group consisting of the unsaturated nitrile-diene-based rubber-aromatic vinyl graft terpolymer, the alkylmethacrylate-diene-based rubber-aromatic vinyl graft terpolymer, and the alkylmethacrylate-silicone/alkylacrylate graft terpolymer.

The polymer resin composition may further include 5 to 90% by weight of a polycarbonate.

Furthermore, the polymer resin composition may further include one or more selected from the group consisting of an aromatic vinyl-aromatic maleimide-maleic anhydride terpolymer, an aromatic vinyl-unsaturated nitrile-aromatic maleimide terpolymer, an aromatic vinyl-α-methyl aromatic vinyl terpolymer, and an aromatic vinyl-unsaturated nitrile-α-methyl aromatic vinyl terpolymer. If these components are included in an amount of 1 to 80% by weight, heat resistance of the polymer resin composition may be improved.

The polymer resin composition according to the present invention may be designed to exhibit excellent impact strength and heat resistance of 85~90° C. when used for general high impact resistance, to exhibit heat resistance of 90~100° C. when used for heat resistance and high impact resistance, and to exhibit heat resistance of 100° C. or higher when used for high heat resistance and high impact resistance. According to such use, a polycarbonate is used for high heat resistance of 100° C. or higher, but one or more selected from the group consisting of an aromatic vinyl-aromatic maleimide-maleic anhydride terpolymer, an aromatic vinyl-unsaturated nitrile-aromatic maleimide terpolymer, an aromatic vinyl-α-methyl aromatic vinyl terpolymer, and an aromatic vinyl-unsaturated nitrile-α-methyl aromatic vinyl terpolymer may be used instead of a polycarbonate for general high impact resistance, and for heat resistance and high impact resistance.

As used herein, the term 'residue' means a moiety or unit which is contained in the product of a chemical reaction of a specific compound and is derived from the specific compound. For example, each of the 'residue' of the dicarboxylic acid component and the 'residue' of the diol component means either a moiety derived from the dicarboxylic acid component or the diol component of polyester formed by esterification or polycondensation.

The 'dicarboxylic acid component' means to include a dicarboxylic acid such as terephthalic acid, an alkyl ester thereof (e.g., a lower alkyl ester having 1 to 4 carbon atoms such as monomethyl, monoethyl, dimethyl, diethyl, or dibutyl ester), and/or an acid anhydride thereof, and may react with the diol component to form a dicarboxylic acid moiety such as a terephthaloyl moiety.

The dicarboxylic acid component used in the polyester synthesis contains terephthalic acid, thereby improving physical properties of the polyester resin to be prepared, such as heat resistance, chemical resistance, or weather resistance (e.g., prevention of a reduction in the molecular weight or yellowing due to UV).

The dicarboxylic acid component may further include an aromatic dicarboxylic acid component, an aliphatic dicarboxylic acid component, or a mixture thereof as another dicarboxylic acid component. In this regard, 'another dicarboxylic acid component' means a component excluding terephthalic acid among the dicarboxylic acid components.

Meanwhile, in the polyester tetrapolymer, the dicarboxylic acid component may further include one or more selected from the group consisting of aromatic dicarboxylic acids having 8 to 20 carbon atoms and aliphatic dicarboxylic acids having 4 to 20 carbon atoms.

The aromatic dicarboxylic acid component may be aromatic dicarboxylic acids having 8 to 20 carbon atoms, preferably 8 to 14 carbon atoms, or a mixture thereof. Examples of the aromatic dicarboxylic acid may include isophthalic acid, naphthalene dicarboxylic acid such as 2,6-naphthalene dicarboxylic acid, diphenyl dicarboxylic acid, 4,4'-stilbene dicarboxylic acid, 2,5-furan dicarboxylic acid, and 2,5-thiophene dicarboxylic acid, but specific examples of the aromatic dicarboxylic acid are not limited thereto.

The aliphatic dicarboxylic acid component may be an aliphatic dicarboxylic acid component having 4 to 20 carbon atoms, preferably 4 to 12 carbon atoms, or a mixture thereof. Examples of the aliphatic dicarboxylic acid may include cyclohexanedicarboxylic acid such as 1,4-cyclohexanedicarboxylic acid or 1,3-cyclohexanedicarboxylic acid, or linear or cyclic aliphatic dicarboxylic acid components such as phthalic acid, sebacic acid, succinic acid, isodecylsuccinic acid, maleic acid, fumaric acid, adipic acid, glutaric acid, or azelaic acid, but specific examples of the aliphatic dicarboxylic acid are not limited thereto.

The dicarboxylic acid component may include 50 to 100 mol %, preferably 70 to 100 mol %, of terephthalic acid, and 0 to 50 mol %, preferably 0 to 30 mol %, of one or more dicarboxylic acids selected from the group consisting of aromatic dicarboxylic acids and aliphatic dicarboxylic acids. If the content of terephthalic acid in the dicarboxylic acid component is too low or high, physical properties of the polyester resin, such as heat resistance, chemical resistance, or weather resistance, may be reduced.

The diol component used in the polyester synthesis may include dianhydrohexitol at 5 to 60 mol %, cyclohexane dimethanol at 5 to 80 mol %, and other diol compound at a residual amount.

The diol component preferably contains isosorbide (1,4:3,6-dianhydroglucitol) as dianhydrohexitol, thereby improving physical properties of chemical resistance as well as heat resistance of the polyester resin to be prepared. As the content of cyclohexane dimethanol (e.g., 1,2-cyclohexanedimethanol, 1,3-cyclohexanedimethanol, or 1,4-cyclohexanedimethanol) is increased in the diol component, impact resistance of the polyester resin to be prepared may be greatly increased.

The diol component may further include other diol components in addition to isosorbide and cyclohexanedimethanol. 'Other diol components' means diol components excluding isosorbide and cyclohexanedimethanol, and for example, it may be aliphatic diol, aromatic diol, or a mixture thereof.

In the polyester tetrapolymer, the diol component may further include one or more selected from the group consisting of compounds represented by Chemical Formulae 1, 2, and 3.

[Chemical Formula 1]

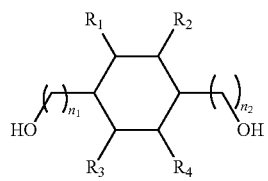

Herein, $R_1$, $R_2$, $R_3$, and $R_4$ are each independently hydrogen or a substituted or unsubstituted alkyl group having 1 to 5 carbon atoms, and $n_1$ and $n_2$ are each independently an integer of 0 to 3.

[Chemical Formula 2]

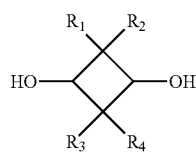

Herein, $R_1$, $R_2$, $R_3$, and $R_4$ are each independently hydrogen or a substituted or unsubstituted alkyl group having 1 to 5 carbon atoms.

[Chemical Formula 3]

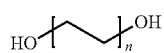

Herein, n is an integer of 1 to 7.

As described above, the diol component of the polyester resin may include 5 to 60 mol % of dianhydrohexitol. If the content of dianhydrohexitol in the diol component is less than 5 mol %, heat resistance or chemical resistance of the polyester resin to be prepared will be insufficient, and melting viscosity property of the above-described polyester resin may not be obtained. Further, if the content of dianhydrohexitol is more than 60 mol %, appearance of the polyester resin or product may be deteriorated or yellowing may occur.

The polyester tetrapolymer may have a weight average molecular weight of 10,000 to 100,000 and a glass transition temperature of 0 to 200° C.

The polyester resin may be provided by a preparation method of the polyester resin including the steps of: esterifying a diol component containing 5 to 60 mol % of isosorbide as dianhydrohexitol, 5 to 80 mol % of cyclohexanedimethanol, and a residual amount of another diol compound with a dicarboxylic acid component containing terephthalic acid; adding a phosphorus-based stabilizer when the degree of esterification reaches at least 80%; and subjecting the esterification product to polycondensation.

According to the preparation method of the polyester resin, a catalyst including a zinc compound is used for the esterification reaction, a phosphorus-based stabilizer is added to the reaction solution at the end of the esterification reaction, for example, when the degree of esterification reaches at least 80%, and the resulting esterification product is subjected to polycondensation, thereby providing a polyester resin that exhibits physical properties of high heat resistance, flame retardancy, and impact resistance, and has an excellent appearance property, high transparency, and an excellent molding property.

Detailed descriptions of the dicarboxylic acid component containing terephthalic acid, cyclohexanedimethanol, isosorbide, and other diol compounds are the same as described above.

The esterification reaction between the dicarboxylic acid components and the diol components may be carried out at a pressure of 0 to 10.0 kg/cm$^2$ and a temperature of 150 to 300° C. The esterification reaction conditions may be appropriately varied depending on specific characteristics of the final polyester, the molar ratio between the dicarboxylic acid components and glycol, or processing conditions. Preferred exemplary conditions for the esterification reaction include a pressure of 0 to 5.0 kg/cm$^2$, more preferably 0.1 to 3.0 kg/cm$^2$, and a temperature of 200 to 270° C., more preferably 240 to 260° C.

The esterification reaction may be carried out in a batch or continuous manner. The respective raw materials may be separately added, but they are preferably added in the form of a slurry by mixing the diol components with the dicarboxylic acid components. The slurry may be prepared by dissolving the diol components such as dianhydrohexitol in the form of a solid at room temperature in water or ethylene glycol, and then mixing the solution with the dicarboxylic acid components containing terephthalic acid. Alternatively, the slurry may be prepared by melting dianhydrohexitol at 60° C. or higher, and then mixing the molten dianhydrohexitol with the dicarboxylic acid components containing terephthalic acid and other diol components. Water may be further added to the slurry of the dicarboxylic acid components and the terpolymerized diol components of dianhydrohexitol and ethylene glycol, thereby enhancing the flowability of the slurry.

The molar ratio between the dicarboxylic acid components and the diol components participating in the esterification reaction may be 1:1.05 to 1:3.0. If the molar ratio of the dicarboxylic acid component:diol component is less than 1:1.05, the dicarboxylic acid components may remain unreacted after polymerization, causing poor transparency of the resin. Further, if the molar ratio exceeds 1:3.0, the polymerization rate may be lowered or the productivity of the resin may be deteriorated.

The polycondensation reaction step of the esterification products may include the step of reacting the esterification products of the dicarboxylic acid component and the diol component at a temperature of 150 to 300° C. and a reduced pressure of 600 to 0.01 mmHg for 1 to 24 hours.

The polycondensation reaction may be carried out at a temperature of 150 to 300° C., preferably 200 to 290° C., and more preferably 260 to 280° C., and a reduced pressure of 600 to 0.01 mmHg, preferably 200 to 0.05 mmHg, and more preferably 100 to 0.1 mmHg. The reduced pressure condition of the polycondensation reaction enables the removal of glycol, which is a by-product of the polycondensation reaction, from the system. If the polycondensation reaction is carried out outside the reduced pressure range of 400 to 0.01 mmHg, removal of the by-product may be insufficient.

If the polycondensation reaction is carried out outside the temperature range of 150 to 300° C., that is, if the polycondensation reaction is carried out at a temperature of lower than 150° C., glycol which is a by-product of the polycondensation reaction cannot be effectively removed from the system, and as a result, the intrinsic viscosity of the final reaction product may be lowered, which deteriorates the physical properties of the polyester resin, and if the reaction is carried out at a temperature of higher than 300° C., there is a high possibility that yellowing may occur on appearance of the polyester resin. The polycondensation reaction may be carried out for a time necessary for the intrinsic viscosity of the final reaction product to reach an appropriate level, for example, for an average retention time of 1 to 24 hours.

The preparation method of the polyester resin composition may further include the step of adding a polycondensation catalyst. The polycondensation catalyst may be added to the esterification or transesterification reaction product before initiation of the polycondensation reaction. Alternatively, the polycondensation catalyst may be added to a slurry mixture containing the diol components and the dicarboxylic acid components before or during the esterification reaction.

As the polycondensation catalyst, a titanium compound, a germanium compound, an antimony compound, an aluminum compound, a tin compound, or a mixture thereof may be used. Examples of the titanium compound and the germanium compound are the same as those described above.

The polymer resin composition according to the present invention includes one or more terpolymers selected from the group consisting of an unsaturated nitrile-diene-based rubber-aromatic vinyl graft terpolymer, an alkylmethacrylate-diene-based rubber-aromatic vinyl graft terpolymer, and an alkylmethacrylate-silicone/alkylacrylate graft terpolymer.

The unsaturated nitrile-diene-based rubber-aromatic vinyl graft terpolymer may be a core-shell rubber, in which its average particle size may be 0.01 to 5 µm, its graft ratio may be 5 to 90%, a glass transition temperature of the core may be −20° C. or lower, and a glass transition temperature of the shell may be 20° C. or higher.

The unsaturated nitrile-diene-based rubber-aromatic vinyl graft terpolymer is a core-shell rubber prepared by an emulsion polymerization or bulk polymerization process, in which its average particle size may be 0.01 to 5 µm, its graft ratio may be 5 to 90%, a glass transition temperature of the core may be −20° C. or lower, and a glass transition temperature of the shell may be 20° C. or higher, and optionally, the shell may or may not contain a functional group such as glycidyl methacrylate or maleic anhydride.

In the unsaturated nitrile-diene-based rubber-aromatic vinyl graft terpolymer, the unsaturated nitrile may be one or more selected from the group consisting of acrylonitrile, methacrylonitrile, ethacrylonitrile, phenylacrylonitrile, and α-chloroacrylonitrile.

In the above graft terpolymers, the diene-based rubber may be a butadiene-type rubber or an isoprene-type rubber.

Furthermore, in the above graft terpolymers, the aromatic vinyl may be one or more selected from the group consisting of styrene, α-methyl styrene vinyltoluene, t-butyl styrene, halogen-substituted styrene, 1,3-dimethyl styrene, 2,4-dimethyl styrene, and ethyl styrene.

The core-shell rubbers may optionally have a morphology with monomodal distribution of an average particle size of 0.01 to 5 µm or a morphology with multimodal distribution of an average particle size of 0.01 to 5 µm.

The alkyl methacrylate may be one or more selected from the group consisting of methyl methacrylate, ethyl methacrylate, propyl methacrylate, isopropyl methacrylate, and butyl methacrylate.

Preferably, the unsaturated nitrile-diene-based rubber-aromatic vinyl graft terpolymer may be an acrylonitrile-butadiene-styrene graft terpolymer, and the alkyl methacrylate-diene-based rubber-aromatic vinyl graft terpolymer may be a methyl methacrylate-butadiene-styrene graft terpolymer. Furthermore, the alkylmethacrylate-silicone/alkylacrylate graft terpolymer may be a methyl methacrylate-silicone/butylacrylate graft terpolymer.

The polycarbonate may have a glass transition temperature of 50 to 200° C. and a weight average molecular weight of 10,000 to 200,000.

The polymer resin composition may further include one or more selected from the group consisting of an unsaturated nitrile-aromatic vinyl terpolymer, an unsaturated nitrile-aromatic vinyl-glycidyl methacrylate-based compatibilizer, an unsaturated nitrile-aromatic vinyl-maleic anhydride-based compatibilizer, a saturated ethylene-alkylacrylate-glycidyl methacrylate-based compatibilizer, and a carbodiimide-based anti-hydrolysis agent.

The polymer resin composition may include 80% by weight or less of the unsaturated nitrile-aromatic vinyl terpolymer, 50% by weight or less of the unsaturated nitrile-aromatic vinyl-glycidyl methacrylate-based compatibilizer, 50% by weight or less of the unsaturated nitrile-aromatic vinyl-maleic anhydride-based compatibilizer, 50% by weight or less of the saturated ethylene-alkylacrylate-glycidyl methacrylate-based compatibilizer, and 30% by weight or less of the carbodiimide-based anti-hydrolysis agent.

The alkylacrylate may be one or more selected from the group consisting of methyl acrylate, ethyl acrylate, propyl acrylate, isopropyl acrylate, butyl acrylate, hexyl acrylate, octyl acrylate, and 2-ethylhexyl acrylate.

The unsaturated nitrile-aromatic vinyl terpolymer may have a glass transition temperature of 50 to 200° C. and a weight average molecular weight of 10,000 to 5,000,000.

The unsaturated nitrile-aromatic vinyl-glycidyl methacrylate-based compatibilizer may have a glass transition temperature of 20 to 200° C. and a weight average molecular weight of 200 to 300,000, and optionally, it may be replaced by aromatic vinyl-glycidyl methacrylate.

The unsaturated nitrile-aromatic vinyl-maleic anhydride-based compatibilizer may have a glass transition temperature of 20 to 200° C. and a weight average molecular weight of 200 to 300,000, and the saturated ethylene-alkylacrylate-glycidyl methacrylate-based compatibilizer may have a glass transition temperature of −150 to 200° C. and a weight average molecular weight of 200 to 300,000.

Further, the carbodiimide-based anti-hydrolysis agent may have a weight average molecular weight of 50 to 300,000 and may be represented by the following Chemical Formula 4 or Chemical Formula 5.

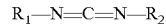  [Chemical Formula 4]

Herein, $R_1$ and $R_2$ are each independently a hydrogen atom, an alkyl group having 1 to 20 carbon atoms, or an aryl group having 6 to 36 carbon atoms.

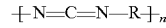  [Chemical Formula 5]

Herein, R is an alkyl group having 1 to 20 carbon atoms or an aryl group having 6 to 36 carbon atoms, and n is an integer of 2 to 30,000 and represents an average degree of polymerization.

The polymer resin composition may include: 10% by weight or less of one or more additives selected from the group consisting of an antioxidant, a lubricant, a light stabilizer, a light absorber, a transesterification inhibitor, and an anti-hydrolysis agent, based on the total resin composition which is composed of a polyester tetrapolymer including a residue of a dicarboxylic acid component containing terephthalic acid and a residue of a diol component containing dianhydrohexitol; and one or more terpolymers selected from the group consisting of an unsaturated nitrile-diene-based rubber-aromatic vinyl graft terpolymer, an alkylmethacrylate-diene-based rubber-aromatic vinyl graft terpolymer, and an alkylmethacrylate-silicone/alkylacrylate graft terpolymer.

The hindered phenolic antioxidant may have a weight average molecular weight of 50 to 300,000.

The phosphite-based antioxidant may be selected from the group consisting of the following Chemical Formula 6, Chemical Formula 7, and Chemical Formula 8.

[Chemical Formula 6]

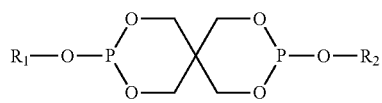

Herein, $R_1$ and $R_2$ are each independently a substituted or unsubstituted alkyl group having 1 to 40 carbon atoms or a substituted or unsubstituted aryl group having 6 to 40 carbon atoms.

[Chemical Formula 7]

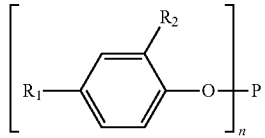

Herein, $R_1$ and $R_2$ are each independently a substituted or unsubstituted alkyl group having 1 to 40 carbon atoms or a substituted or unsubstituted aryl group having 6 to 40 carbon atoms, and n is an integer of 1 or more and represents a substituted repeating unit.

[Chemical Formula 8]

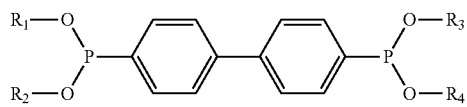

Herein, $R_1$, $R_2$, $R_3$, and $R_4$ are each independently a substituted or unsubstituted alkyl group having 1 to 40 carbon atoms or a substituted or unsubstituted aryl group having 6 to 40 carbon atoms.

The thioester-based antioxidant may be a compound represented by the following Chemical Formula 9 or Chemical Formula 10.

[Chemical Formula 9]

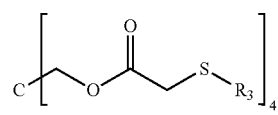

[Chemical Formula 10]

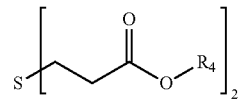

Herein, $R_3$ and $R_4$ are each independently a substituted or unsubstituted alkyl group having 1 to 40 carbon atoms or a substituted or unsubstituted aryl group having 6 to 40 carbon atoms.

The lubricant may be one or more selected from the group consisting of a metal stearate-based lubricant, an amide-based lubricant, a paraffin-based lubricant, and an ester-based lubricant.

The light stabilizer and the light absorber may be a HALS-based light stabilizer, a benzotriazole-based light absorber, or a benzophenone-based light absorber.

The transesterification inhibitor may be a phosphorus compound containing at least a hydroxyl functional group and an alkylester functional group or a hydrazine compound containing a unit represented by the following Chemical Formula 11.

[Chemical Formula 11]

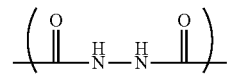

Furthermore, the polymer resin composition according to the present invention may further include an additive selected from the group consisting of a chain extender or a coupling agent containing a glycidyl methacrylate unit, an inorganic additive, a filler, a dye, a pigment, and a coloring agent.

Hereinafter, preferred examples of the present invention will be explained in more detail. However, these examples are provided for illustrative purposes and are not intended to limit the scope of the present invention.

EXAMPLE 1

3% by weight of acrylonitrile-styrene-glycidyl methacrylate, 0.2% by weight of a phenolic primary antioxidant, and 0.2% by weight of a phosphite-based secondary antioxidant were added together, based on 100% by weight of a resin consisting of 70% by weight of terephthalic acid-isosorbide-1,4-cyclohexanediol-ethylene glycol tetrapolymer polyester (Tg: 140° C., weight average molecular weight: 40,000), 10% by weight of an acrylonitrile-butadiene-styrene graft terpolymer, 5% by weight of a methyl methacrylate-butadiene-styrene graft terpolymer, and 15% by weight of polycarbonate, and kneading extrusion was uniformly carried out using a twin-screw kneading extruder (Φ: 40 mm, L/D=40) so as to prepare a pellet.

In this regard, the terephthalic acid-isosorbide-1,4-cyclohexanediol-ethylene glycol tetrapolymer polyester was an environment-friendly resin having high impact resistance, ECOZEN available from SK Chemicals (Korea), the acrylonitrile-butadiene-styrene graft terpolymer was a core-shell rubber-type graft ABS, HR-181 available from Kumho Petrochemical Co., the methyl methacrylate-butadiene-styrene graft terpolymer was a core-shell rubber-type graft MBS, M-511 available from KANEKA Co. (Japan), the polycarbonate was 3020PJ available from Samyang Corp., the acrylonitrile-styrene-glycidyl methacrylate was SAG-001 available from SUNNY FC (China), the phenolic primary antioxidant was AO-60 available from ADEKA Corp. (Japan), and the phosphite-based secondary antioxidant was S-9228 available from DOVER Chemical Corp. (USA).

EXAMPLE 2

3% by weight of acrylonitrile-styrene-glycidyl methacrylate, 0.2% by weight of a phenolic primary antioxidant, and 0.2% by weight of a phosphite-based secondary antioxidant were added together, based on 100% by weight of a resin consisting of 70% by weight of terephthalic acid-isosorbide-1,4-cyclohexanediol-ethylene glycol tetrapolymer polyester (Tg: 130° C., weight average molecular weight: 40,000), 10% by weight of an acrylonitrile-butadiene-styrene graft terpolymer, 5% by weight of a methyl methacrylate-butadiene-styrene graft terpolymer, and 15% by weight of polycarbonate, and kneading extrusion was uniformly carried out using a twin-screw kneading extruder (Φ: 40 mm, L/D=40) so as to prepare a pellet.

EXAMPLE 3

3% by weight of acrylonitrile-styrene-glycidyl methacrylate, 0.2% by weight of a phenolic primary antioxidant, and 0.2% by weight of a phosphite-based secondary antioxidant were added together, based on 100% by weight of a resin consisting of 70% by weight of terephthalic acid-isosorbide-1,4-cyclohexanediol-ethylene glycol tetrapolymer polyester (Tg: 120° C., weight average molecular weight: 50,000), 5% by weight of an acrylonitrile-butadiene-styrene graft terpolymer, 10% by weight of a methyl methacrylate-butadiene-styrene graft terpolymer, and 15% by weight of polycarbonate, and kneading extrusion was uniformly carried out using a twin-screw kneading extruder (Φ: 40 mm, L/D=40) so as to prepare a pellet.

EXAMPLE 4

2% by weight of acrylonitrile-styrene-glycidyl methacrylate, 0.2% by weight of a phenolic primary antioxidant, and 0.2% by weight of a phosphite-based secondary antioxidant were added together, based on 100% by weight of a resin consisting of 70% by weight of terephthalic acid-isosorbide-1,4-cyclohexanediol-ethylene glycol tetrapolymer polyester (Tg: 130° C., weight average molecular weight: 40000), 15% by weight of a methyl methacrylate-butadiene-styrene graft terpolymer, and 15% by weight of polycarbonate, and kneading extrusion was uniformly carried out using a twin-screw kneading extruder (Φ: 40 mm, L/D=40) so as to prepare a pellet.

EXAMPLE 5

3% by weight of acrylonitrile-styrene-maleic anhydride, 0.2% by weight of a phenolic primary antioxidant, and 0.2% by weight of a phosphite-based secondary antioxidant were added together, based on 100% by weight of a resin consisting of 70% by weight of terephthalic acid-isosorbide-1,4-cyclohexanediol-ethylene glycol tetrapolymer polyester (Tg: 130° C., weight average molecular weight: 40,000), 15% by weight of a methyl methacrylate-butadiene-styrene graft terpolymer, and 15% by weight of polycarbonate, and kneading extrusion was uniformly carried out using a twin-screw kneading extruder (Φ: 40 mm, L/D=40) so as to prepare a pellet.

In this regard, the acrylonitrile-styrene-maleic anhydride was SAM-002 available from SUNNY FC (China).

EXAMPLE 6

3% by weight of acrylonitrile-styrene-maleic anhydride, 0.5% by weight of a carbodiimide-based anti-hydrolysis agent, 0.2% by weight of a phenolic primary antioxidant, and 0.2% by weight of a phosphite-based secondary antioxidant were added together, based on 100% by weight of a resin consisting of 70% by weight of terephthalic acid-isosorbide-1,4-cyclohexanediol-ethylene glycol tetrapolymer polyester (Tg: 130° C., weight average molecular weight: 40,000), 15% by weight of a methyl methacrylate-butadiene-styrene graft terpolymer, and 15% by weight of polycarbonate, and kneading extrusion was uniformly carried out using a twin-screw kneading extruder (Φ: 40 mm, L/D=40) so as to prepare a pellet.

In this regard, the carbodiimide-based anti-hydrolysis agent was 9000 available from Raschig GmbH (Germany).

EXAMPLE 7

3% by weight of acrylonitrile-styrene-maleic anhydride, 0.5% by weight of a carbodiimide-based anti-hydrolysis agent, 0.2% by weight of a phenolic primary antioxidant, and 0.2% by weight of a phosphite-based secondary antioxidant were added together, based on 100% by weight of a resin consisting of 65% by weight of terephthalic acid-isosorbide-1,4-cyclohexanediol-ethylene glycol tetrapolymer polyester (Tg: 130° C., weight average molecular weight: 40,000), 15% by weight of an acrylonitrile-butadiene-styrene graft terpolymer, and 20% by weight of polycarbonate, and kneading extrusion was uniformly carried out using a twin-screw kneading extruder (Φ: 40 mm, L/D=40) so as to prepare a pellet.

EXAMPLE 8

2% by weight of acrylonitrile-styrene-glycidyl methacrylate, 0.2% by weight of a phenolic primary antioxidant, and 0.2% by weight of a phosphite-based secondary antioxidant were added together, based on 100% by weight of a resin consisting of 70% by weight of terephthalic acid-isosorbide-1,4-cyclohexanediol-ethylene glycol tetrapolymer polyester (Tg: 140° C., weight average molecular weight: 40,000), 20% by weight of a methyl methacrylate-butadiene-styrene graft terpolymer, and 10% by weight of an acrylonitrile-styrene terpolymer, and kneading extrusion was uniformly carried out using a twin-screw kneading extruder (Φ: 40 mm, L/D=40) so as to prepare a pellet.

In this regard, the acrylonitrile-styrene terpolymer was a bulk SAN product, SAN-326 available from Kumho Petrochemical Co., and the phosphite-based secondary antioxidant was Igarfos 168 and P-EPQ available from Clariant Chemicals (Switzerland).

EXAMPLE 9

3% by weight of acrylonitrile-styrene-glycidyl methacrylate, 0.2% by weight of a phenolic primary antioxidant, and 0.2% by weight of a phosphite-based secondary antioxidant were added together, based on 100% by weight of a resin consisting of 70% by weight of terephthalic acid-isosorbide-1,4-cyclohexanediol-ethylene glycol tetrapolymer polyester (Tg: 120° C., weight average molecular weight: 50,000), 15% by weight of a methyl methacrylate-silicone/butyl acrylate graft terpolymer, and 15% by weight of polycarbonate, and kneading extrusion was uniformly carried out using a twin-screw kneading extruder (Φ: 40 mm, L/D=40) so as to prepare a pellet.

In this regard, the methyl methacrylate-silicone/butyl acrylate graft terpolymer was a core-shell rubber-type graft MBS, S-2001 available from Mitsubishi Rayon Co. (Japan).

EXAMPLE 10

3% by weight of acrylonitrile-styrene-glycidyl methacrylate, 0.2% by weight of a phenolic primary antioxidant, and 0.2% by weight of a phosphite-based secondary antioxidant were added together, based on 100% by weight of a resin consisting of 70% by weight of terephthalic acid-isosorbide-1,4-cyclohexanediol-ethylene glycol tetrapolymer polyester (Tg: 120° C., weight average molecular weight: 50,000), 10% by weight of an acrylonitrile-butadiene-styrene graft terpolymer, 5% by weight of a methyl methacrylate-butadiene-styrene graft terpolymer, 10% by weight of general polycarbonate, and 5% by weight of polymer polycarbonate, and kneading extrusion was uniformly carried out using a twin-screw kneading extruder (Φ: 40 mm, L/D=40) so as to prepare a pellet.

In this regard, the general polycarbonate was 3020PJ available from Samyang Corp., and the polymer polycarbonate was 3030PJ available from Samyang Corp.

EXAMPLE 11

2% by weight of acrylonitrile-styrene-maleic anhydride, 0.2% by weight of a phenolic primary antioxidant, and 0.2% by weight of a phosphite-based secondary antioxidant were added together, based on 100% by weight of a resin consisting of 60% by weight of terephthalic acid-isosorbide-1,4-cyclohexanediol-ethylene glycol tetrapolymer polyester (Tg: 120° C., weight average molecular weight: 50,000), 10% by weight of an acrylonitrile-butadiene-styrene graft terpolymer, 23% by weight of polycarbonate, and 7% by weight of styrene-N-phenylmaleimide-maleic anhydride, and kneading extrusion was uniformly carried out using a twin-screw kneading extruder (Φ: 40 mm, L/D=40) so as to prepare a pellet.

In this regard, the polycarbonate was 3030PJ available from Samyang Corp., the styrene-N-phenylmaleimide-maleic anhydride was MS-NI available from DENKI KAGAKU (Japan), and the acrylonitrile-styrene-maleic anhydride was a compatibilizer SAM-002 available from SUNNY FC (China).

EXAMPLE 12

2% by weight of acrylonitrile-styrene-maleic anhydride, 0.2% by weight of a phenolic primary antioxidant, and 0.2% by weight of a phosphite-based secondary antioxidant were added together, based on 100% by weight of a resin consisting of 60% by weight of terephthalic acid-isosorbide-1,4-cyclohexanediol-ethylene glycol tetrapolymer polyester (Tg: 120° C., weight average molecular weight: 50,000), 10% by weight of a methyl methacrylate-butadiene-styrene graft terpolymer, 23% by weight of polycarbonate, and 7% by weight of styrene-N-phenylmaleimide-maleic anhydride, and kneading extrusion was uniformly carried out using a twin-screw kneading extruder (Φ: 40 mm, L/D=40) so as to prepare a pellet.

In this regard, the polycarbonate was 3030PJ available from Samyang Corp., the styrene-N-phenylmaleimide-maleic anhydride was MS-NI available from DENKI KAGAKU (Japan), and the acrylonitrile-styrene-maleic anhydride was a compatibilizer SAM-002 available from SUNNY FC (China).

EXAMPLE 13

2% by weight of acrylonitrile-styrene-maleic anhydride, 0.2% by weight of a phenolic primary antioxidant, and 0.2% by weight of a phosphite-based secondary antioxidant were added together, based on 100% by weight of a resin consisting of 60% by weight of terephthalic acid-isosorbide-1,4-cyclohexanediol-ethylene glycol tetrapolymer polyester (Tg: 120° C., weight average molecular weight: 50,000), 10% by weight of a methyl methacrylate-butadiene-styrene graft terpolymer, 23% by weight of polycarbonate, and 7% by weight of styrene-acrylonitrile-N-phenylmaleimide, and kneading extrusion was uniformly carried out using a twin-screw kneading extruder (Φ: 40 mm, L/D=40) so as to prepare a pellet.

In this regard, the polycarbonate was 3030PJ available from Samyang Corp., the styrene-acrylonitrile-N-phenylmaleimide was P-1460 available from NIPPON SHOKUBAI (Japan), and the acrylonitrile-styrene-maleic anhydride was a compatibilizer SAM-002 available from SUNNY FC (China).

EXAMPLE 14

0.5% by weight of acrylonitrile-styrene-glycidyl methacrylate, 0.2% by weight of a phenolic primary antioxidant, and 0.2% by weight of a phosphite-based secondary antioxidant were added, based on 100% by weight of a resin consisting of 50% by weight of terephthalic acid-isosorbide-1,4-cyclohexanediol-ethylene glycol tetrapolymer polyester (Tg: 95° C., weight average molecular weight: 50,000), 20% by weight of an acrylonitrile-butadiene-styrene graft terpolymer, and 30% by weight of acrylonitrile-α-methyl styrene, and kneading extrusion was uniformly carried out using a twin-screw kneading extruder (Φ: 40 mm, L/D=40) so as to prepare a pellet.

In this regard, the acrylonitrile-α-methyl styrene was VLS available from STYROLUTION (Germany), and the acrylonitrile-styrene-glycidyl methacrylate was a compatibilizer SAG-005 available from SUNNY FC (China).

EXAMPLE 15

0.5% by weight of acrylonitrile-styrene-glycidyl methacrylate, 0.2% by weight of a phenolic primary antioxidant, and 0.2% by weight of a phosphite-based secondary antioxidant were added together, based on 100% by weight of a resin consisting of 50% by weight of terephthalic acid-isosorbide-1,4-cyclohexanediol-ethylene glycol tetrapolymer polyester (Tg: 110° C., weight average molecular weight: 50,000), 20% by weight of an acrylonitrile-butadiene-styrene graft terpolymer, and 30% by weight of acrylonitrile-α-methyl styrene, and kneading extrusion was uniformly carried out using a twin-screw kneading extruder (Φ: 40 mm, L/D=40) so as to prepare a pellet.

In this regard, the acrylonitrile-α-methyl styrene was VLS available from STYROLUTION (Germany), and the acrylonitrile-styrene-glycidyl methacrylate was a compatibilizer SAG-005 available from SUNNY FC (China).

COMPARATIVE EXAMPLES 1 TO 5

The components as given in the following Table 4 were added together, and kneading extrusion was uniformly carried out using a twin-screw kneading extruder (Φ: 40 mm, L/D=40) so as to prepare pellets.

EXPERIMENTAL EXAMPLES

Test of Physical Properties of Molded Articles Manufactured from Polymer Resin Composition The pellets prepared according to Examples 1 to 15 and Comparative Examples 1 to 5 were injected using an injection machine at an injection temperature of 250° C. under the same conditions, and then the injected test samples were adjusted under conditions of 23±2° C. and relative humidity of 50±5%. Their mechanical properties were measured as follows. The test results are given in the following Tables 1 to 4.

Experimental Example 1

Test of Impact Strength

Test samples were prepared in accordance with ASTM D 256, and their impact strength was measured using an Izod impact tester (Toyoseiki).

Experimental Example 2

Test of Tensile Property

Test samples were prepared in accordance with ASTM D 638, and their tensile strength and elongation were measured using a universal testing machine (Zwick Roell Z010).

Experimental Example 3

Test of Flexural Property

Test samples were prepared in accordance with ASTM D 790, and their flexural strength and flexural modulus were measured using a universal testing machine (Zwick Roell Z010).

Experimental Example 4

Test of Heat Resistance

Test samples were prepared in accordance with ASTM D 648, and their heat resistance was measured using a heat resistance tester (HDT Tester, Toyoseiki).

Experimental Example 5

Test of Melt Index

Test samples were prepared in accordance with ASTM D1238, and their melt index was measured using a melt flow indexer (Davenport).

TABLE 1

| Section | Unit | Example 1 | Example 2 | Example 3 | Example 4 | Example 5 |
|---|---|---|---|---|---|---|
| Izod impact strength (1/8") | J/m | 600 | 700 | 850 | 680 | 650 |
| Izod impact strength (1/4") | J/m | 450 | 500 | 650 | 520 | 510 |
| Tensile strength | kg/cm² | 550 | 530 | 530 | 535 | 530 |
| Elongation | % | 110 | 80 | 135 | 85 | 80 |
| Fluidity | 250 °C., 2.16 kg | 5.0 | 6.0 | 7.5 | 5.5 | 5.5 |
| Heat resistance (1.82MPa) | °C. | 123 | 113 | 108 | 113 | 112 |
| Flexural strength | kg/cm² | 850 | 800 | 780 | 810 | 815 |
| Flexural modulus | | 19,800 | 19,500 | 19,400 | 19,200 | 19,300 |

TABLE 2

| Section | Unit | Example 6 | Example 7 | Example 8 | Example 9 | Example 10 |
|---|---|---|---|---|---|---|
| Izod impact strength (1/8") | J/m | 690 | 710 | 610 | 840 | 830 |
| Izod impact strength (1/4") | J/m | 500 | 520 | 460 | 640 | 630 |
| Tensile strength | kg/cm² | 530 | 540 | 560 | 525 | 535 |
| Elongation | % | 85 | 80 | 100 | 140 | 145 |
| Fluidity | 250 °C., 2.16 kg | 7.0 | 6.5 | 5.5 | 7.5 | 6.5 |
| Heat resistance (1.82 MPa) | °C. | 113 | 113 | 115 | 108 | 109 |
| Flexural strength | kg/cm² | 820 | 830 | 860 | 790 | 800 |
| Flexural modulus | kg/cm² | 19,300 | 19,200 | 20,000 | 19,300 | 19,500 |

TABLE 3

| Section | Unit | Example 11 | Example 12 | Example 13 | Example 14 | Example 15 |
|---|---|---|---|---|---|---|
| Izod impact strength (1/8") | J/m | 680 | 670 | 685 | 600 | 610 |
| Izod impact strength (1/4") | J/m | 450 | 440 | 460 | 430 | 430 |
| Tensile strength | kg/cm² | 540 | 550 | 545 | 515 | 520 |
| Elongation | % | 110 | 105 | 105 | 100 | 110 |
| Heat resistance (1.82MPa) | °C. | 105 | 108 | 106 | 90 | 95 |
| Flexural strength | kg/cm² | 810 | 800 | 805 | 780 | 790 |
| Flexural modulus | kg/cm² | 20,500 | 20,300 | 20,400 | 20,000 | 20,200 |

TABLE 4

| Section | Unit | Comparative Example 1 | Comparative Example 2 | Comparative Example 3 | Comparative Example 4 | Comparative Example 5 |
|---|---|---|---|---|---|---|
| PLA | % by weight | 50 | 25 | 45 | | 30 |
| PLLA | | | | | 70 | |
| PDLA | | | | 30 | | |
| PP | | | | 55 | | 65 |
| PC | | | | | 7 | |
| PE Elastomer | | | | | | 5 |
| ABS | | | 20 | | 45 | |
| SAN | | | 25 | | | |
| SMMA | | | 10 | | | |
| PET | | | | | 3 | |
| MA-based compatibilizer | | | | 5 | | |
| PLA-g-MA | | | | 5 | | |
| PE-GMA | | | | 5 | 8 | 3 |

TABLE 4-continued

| | | Comparative Example | | | | |
|---|---|---|---|---|---|---|
| Section | Unit | 1 | 2 | 3 | 4 | 5 |
| PP-g-MA | | | | | | 3 |
| Nano-Clay | | | | | 1 | |
| Triaryl Isocyanate | | | | | 4 | |
| Talc | | | | 5 | | |
| MMA-Talc | | 20 | | | | |
| HI-WAX | | 0.5 | | | | |
| I-245 | | 0.5 | | | | |
| Izod impact strength (⅛") | J/m | 342 | 190 | 87 | 69 | 74 |
| Tensile strength | kg/cm² | 488 | 291 | 711 | 700 | |
| Elongation | % | 27 | 590 | | | |
| Heat resistance | °C. | 69 | 120 | 100 | 95 | 78 |
| Flexural strength | kg/cm² | 786 | | | | |
| Flexural modulus | kg/cm² | 28,230 | 13,000 | | | 17,800 |

*note)
PLA: poly(lactic acid) resin, 3001D available from NatureWorks LLC (USA)
PLLA: L-type poly(lactic acid) resin, Ingeo 3251D available from NatureWorks LLC (USA)
PDLA: poly(lactic acid) resin available from Purac (Holland)
PP: polypropylene block terpolymer available from Honam Petrochemical Corp.
PC: low-viscosity polycarbonate resin
PE Elastomer: polyolefin-based elastomer
ABS: acrylonitrile-butadiene-styrene-based graft terpolymer
SAN: styrene-acrylonitrile resin
SMMA: methyl methacrylate-acrylonitrile-styrene-based terpolymer
PET : polyethylene terephthalate resin
MA-based compatibilizer: maleic anhydride graft ethylene-octene terpolymer
PLA-g-MA: maleic anhydride graft poly(lactic acid) resin
PE-GMA: polyethylene-glycidyl methacrylate resin available from Aldrich (USA)
PP-g-MA: polypropylene-maleic anhydride graft terpolymer available from Honam Petrochemical Corp.
Nano-Clay: organically modified clay Cloisite 20A available from Southern Clay Products (USA)
Triaryl Isocyanate: Triaryl isocyanate available from Tokyo Chemical Industry Co. (Japan)
Talc: KC-3000 available from Koch Co.
MMA-Talc: Talc coated with methyl methacrylate
HI-WAX: low-molecular weight polyethylene 200P available from Mitsui Chemicals (Japan)
I-245: hindered phenolic antioxidant Irganox 245 available from SongWon Industrial Co.

As shown in the test results, the examples showed excellent heat resistance or impact resistance, compared to the comparative examples, indicating that the polymer resin composition according to the present invention exhibits physical properties of improved heat resistance or impact resistance while the components thereof are environment-friendly.

Although specific parts of the present invention have been described in detail, it will be apparent to those skilled in the art that these specific descriptions are provided for preferred embodiments and the scope of the present invention is not limited thereby. Therefore, the scope of the present invention should be defined only by the accompanying claims and equivalents thereof.

What is claimed is:
1. A polymer resin composition, comprising:
   a polyester tetrapolymer including a residue of a dicarboxylic acid component containing terephthalic acid and a residue of a diol component containing dianhydrohexitol;
   one or more terpolymers selected from the group consisting of an unsaturated nitrile-diene-based rubber-aromatic vinyl graft terpolymer, an alkyl methacrylate-diene-based rubber-aromatic vinyl graft terpolymer, and an alkyl methacrylate-silicone/alkyl acrylate graft terpolymer;
   one or more selected from the group consisting of an unsaturated nitrile-aromatic vinyl-glycidyl methacrylate-based compatibilizer, and an unsaturated nitrile-aromatic vinyl-maleic anhydride-based compatibilizer; and
   one or more selected from the group consisting of an aromatic vinyl-aromatic maleimide-maleic anhydride terpolymer, an aromatic vinyl-unsaturated nitrile-aromatic maleimide terpolymer, an aromatic vinyl-α-methyl aromatic vinyl copolymer, and an aromatic vinyl-unsaturated nitrile-α-methyl aromatic vinyl terpolymer.

2. The polymer resin composition of claim 1, comprising 5 to 90% by weight of the polyester tetrapolymer and 1 to 80% by weight of one or more terpolymers selected from the group consisting of the unsaturated nitrile-diene-based rubber-aromatic vinyl graft terpolymer, the alkyl methacrylate-diene-based rubber-aromatic vinyl graft terpolymer, and the alkyl methacrylate-silicone/alkyl acrylate graft terpolymer.

3. The polymer resin composition of claim 1, further comprising 5 to 90% by weight of polycarbonate.

4. The polymer resin composition of claim 1, wherein the polyester tetrapolymer has a weight average molecular weight of 10,000 to 100,000 and a glass transition temperature of 0 to 200° C.

5. The polymer resin composition of claim 1, wherein in the polyester tetrapolymer, the dicarboxylic acid component further includes one or more selected from the group consisting of aromatic dicarboxylic acids having 8 to 20 carbon atoms and aliphatic dicarboxylic acids having 4 to 20 carbon atoms.

6. The polymer resin composition of claim 1, wherein in the polyester tetrapolymer, dianhydrohexitol is isosorbide.

7. The polymer resin composition of claim 1, wherein in the polyester tetrapolymer, the content of dianhydrohexitol is 5 to 60 mol %, based on the total content of the diol component.

8. The polymer resin composition of claim 1, wherein in the polyester tetrapolymer, the diol component further includes one or more selected from the group consisting of compounds represented by the following Chemical Formulae 1, 2, and 3:

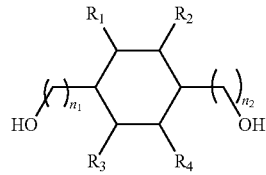

[Chemical Formula 1]

wherein $R_1$, $R_2$, $R_3$, and $R_4$ are each independently hydrogen or a substituted or unsubstituted alkyl group having 1 to 5 carbon atoms, and $n_1$ and $n_2$ are each independently an integer of 0 to 3;

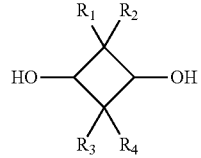

[Chemical Formula 2]

wherein $R_1$, $R_2$, $R_3$, and $R_4$ are each independently hydrogen or a substituted or unsubstituted alkyl group having 1 to 5 carbon atoms; and

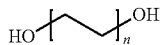
[Chemical Formula 3]

wherein n is an integer of 1 to 7.

9. The polymer resin composition of claim 1, wherein in the polyester tetrapolymer, the diol component further includes 1,4-cyclohexanediol and ethylene glycol.

10. The polymer resin composition of claim 1, wherein the unsaturated nitrile-diene-based rubber-aromatic vinyl graft terpolymer is a core-shell rubber, its average particle size is 0.01 to 5 μm, its graft ratio is 5 to 90%, a glass transition temperature of the core is −20° C. or lower, and a glass transition temperature of the shell is 20° C. or higher.

11. The polymer resin composition of claim 1, wherein in the unsaturated nitrile-diene-based rubber-aromatic vinyl graft terpolymer, unsaturated nitrile is one or more selected from the group consisting of acrylonitrile, methacrylonitrile, ethacrylonitrile, phenylacrylonitrile, and α-chloroacrylonitrile.

12. The polymer resin composition of claim 1, wherein in the graft terpolymer, the diene-based rubber is a butadiene-type rubber or an isoprene-type rubber.

13. The polymer resin composition of claim 1, wherein in the graft terpolymer, aromatic vinyl is one or more selected from the group consisting of styrene, α-methyl styrene vinyltoluene, t-butyl styrene, halogen-substituted styrene, 1,3-dimethyl styrene, 2,4-dimethyl styrene, and ethyl styrene.

14. The polymer resin composition of claim 1, wherein the unsaturated nitrile-diene-based rubber-aromatic vinyl graft terpolymer is an acrylonitrile-butadiene-styrene graft terpolymer.

15. The polymer resin composition of claim 1, wherein the alkylmethacrylate-diene-based rubber-aromatic vinyl graft terpolymer is a methyl methacrylate-butadiene-styrene graft terpolymer.

16. The polymer resin composition of claim 1, wherein the alkylmethacrylate-silicone/alkylacrylate graft terpolymer is a methyl methacrylate-silicone/butyl acrylate graft terpolymer.

17. The polymer resin composition of claim 3, wherein the polycarbonate has a glass transition temperature of 50 to 200° C. and a weight average molecular weight of 10,000 to 200,000.

18. The polymer resin composition of claim 1, further comprising one or more additives selected from the group consisting of an antioxidant, a lubricant, a light stabilizer, a light absorber, a transesterification inhibitor, and an anti-hydrolysis agent.

* * * * *